United States Patent

Clark

[15] 3,648,233

[45] Mar. 7, 1972

[54] LOAD CONTROL ERROR DETECTOR

[72] Inventor: Larry K. Clark, Davenport, Iowa

[73] Assignee: Gulf & Western Industries, New York, N.Y.

[22] Filed: July 3, 1968

[21] Appl. No.: 827,079

[52] U.S. Cl. ............................................. 340/46, 340/248
[51] Int. Cl. ............................................................ G08g 1/097
[58] Field of Search .................. 340/46, 41, 74, 78, 81, 253, 340/253 C, 253 M, 248; 307/252.21, 305, 284

[56] References Cited

UNITED STATES PATENTS 3,384,871  5/1968  Selzer et al. ............................. 340/46
3,414,878  12/1968  Smith ....................................... 340/41

FOREIGN PATENTS OR APPLICATIONS 384,029  12/1932  Great Britain ............................ 340/46
1,033,034  6/1966  Great Britain ............................ 340/46

*Primary Examiner*—Kathleen H. Claffy
*Assistant Examiner*—Randall P. Myers
*Attorney*—Meyer, Tilberry and Body

[57] ABSTRACT

A load control error detector system is disclosed herein for use with a load control system having at least one energizable load. An activatable switching means, such as a triac, serves upon activation by a control signal to couple the load with an alternating current voltage source for energizing the load. A load control mechanism serves to provide a control signal for activating the switching means. More particularly, the error detector circuit serves to provide an error signal whenever the load is energized without a control signal being applied to the activatable switch mechanism.

6 Claims, 2 Drawing Figures

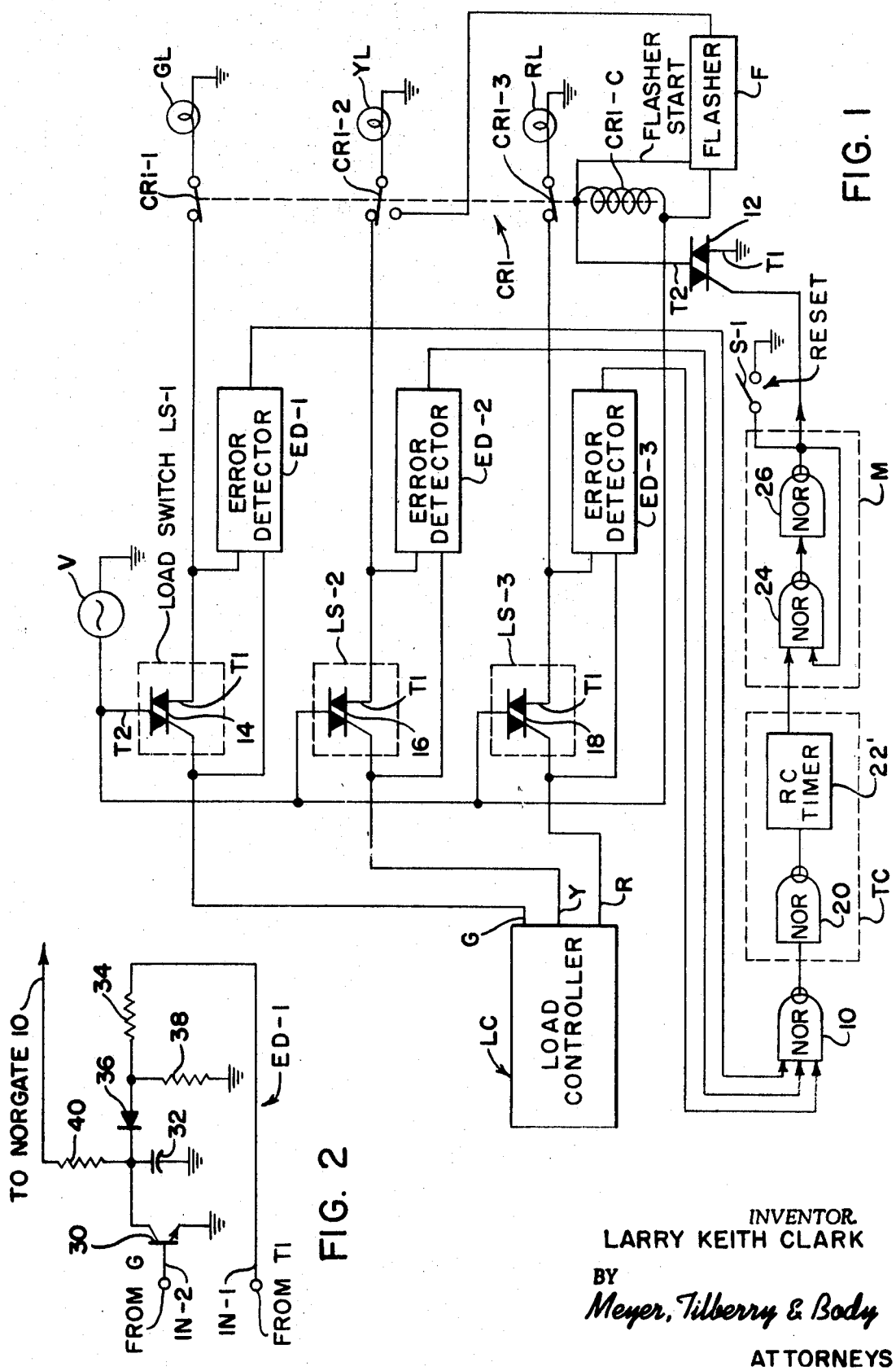

LOAD CONTROL ERROR DETECTOR

This invention relates to the art of load control and, more particularly, to an error detector for providing an error signal when a load is inadvertently energized.

The invention is particularly applicable in conjunction with detecting whether a traffic signal light has been inadvertently energized, and is described with particular reference thereto, although, the invention is not limited to same as it may be used in conjunction with detecting whether various types of load are inadvertently energized.

Many load control systems, such as in traffic control, incorporate a load, such as a signal light, adapted to be energized by alternating current from a line voltage source. A load controller, such as a traffic signal controller, provides a control signal for activating a switch, such as a relay or a triac, to connect the load with an alternating current voltage source. It is possible in such systems for the switch, relay or triac, to malfunction and become short circuited whereupon the load becomes energized even though a control signal has not been applied to the switch. It may, therefore, be desirable to provide an alarm signal, audible or visual, to indicate this error condition. In the case of traffic control, it may be preferable to energize a flasher mechanism to cause a yellow, or caution, signal to alternately flash on and off until the necessary repairs are made.

The present invention is directed toward an error detector circuit for satisfying the foregoing needs with a minimum of circuitry required.

The present invention contemplates the provision of a load control system having at least one energizable load together with an activatable switching means, such as a triac, for, upon activation by a control signal, coupling the load with an alternating current voltage source for energizing the load. It is further contemplated that a load control means serve to provide the control signal.

In accordance with the present invention circuit means are provided for developing an error signal in response to a condition existing, wherein the load is energized in the absence of a control signal being applied to the activatable switching means.

In accordance with a more limited aspect of the present invention, an error detector circuit includes a first input for receiving alternating current from the alternating current voltage source and a second input for receiving a control signal, together with circuit means interposed between the two inputs for providing an error signal whenever the alternating current is not concurrently received along with the control signal.

In accordance with a still further aspect of the present invention, it is contemplated that the load control system take the form of a traffic control system having at least one traffic signal light for displaying a traffic signal indication, and that the load control means incorporate a traffic signal control means for providing the control signal to the activatable switching means.

The primary object of the present invention is to provide an error detector circuit for a load control system for purposes of detecting whether a load is inadvertently energized.

Another object of the present invention is to provide an error detector circuit which is relatively inexpensive to manufacture and is economical to operate.

A still further object of the present invention is to provide an error detector circuit for detecting whether a traffic signal light has been energized inadvertently rather than upon command by an associated traffic signal controller.

It is a still further object of the present invention to provide an error detector circuit having visual output means for providing a visual indication of an erroneous energization of a load.

The foregoing and other objects and advantages of the invention will become apparent from the following description of a preferred embodiment of the invention and the appended claims when taken in conjunction with the accompanying drawings wherein:

FIG. 1 is a combined block-schematic diagram illustrating the preferred embodiment of the invention; and, FIG. 2 is a schematic diagram illustrating the preferred error detection circuitry.

GENERAL DESCRIPTION

Referring now to FIG. 1 wherein the showings are made for purposes of illustrating the preferred embodiment of the invention only, and not for the purpose of limiting same, there is illustrated a load control system which generally comprises a load controller LC having three output circuits G, Y and R, each for carrying a control signal for respectively actuating load switches LS-1, LS-2 and LS-3, which, when activated serve to respectively connect an associated load GL, YL or RL with an alternating current voltage source V. Error detector circuits ED-1, ED-2 and ED-3 are respectively associated with load switches LS-1, LS-2 and LS-3, and have their outputs commonly connected to the input of a NOR-gate 10. The output of NOR-gate 10 is coupled through a timer control circuit TC to a memory circuit M. The output of memory circuit M is, in turn, coupled to the gate of a triac 12 which, when biased into conduction, serves to apply alternating current voltage source across coil CR1-C of a relay CR1. Briefly, during operation the load controller serves to sequentially apply a direct current control signal on its output terminals G, Y and R for purposes of sequentially energizing loads GL, YL and RL. Error detector circuits ED-1, ED-2 and ED-3 serve to respectively monitor the operation of their associated load switches LS-1, LS-2 and LS-3. In the event, for example, that green light GL is energized by the alternating current voltage source V when no control signal is present on output circuit G of the load controller LC, then the error detector ED-1 applies a binary "1" signal into the input of NOR-gate 10. This triggers an operation, as will be described in detail hereinafter, wherein relay CR1 becomes energized to couple flasher F to yellow light YL so that this light alternately flashes on and off.

LOAD CONTROL SYSTEM

In the embodiment illustrated in FIG. 1, the load control system takes the form of a traffic control application wherein the loads GL, YL and RL are respectively the green light, yellow light and red light of a traffic signal for presenting visual traffic signal commands. The load controller LC takes the form of a traffic controller having outputs G, Y and R which are sequentially energized with direct current for, in turn, providing command signals to load switches LS-1, LS-2 and LS-3 to energize the signal lights GL, YL and RL. Typically, such traffic controllers incorporate direct current logic circuitry for determining when the green, yellow and red output terminals G, Y and R are to be energized, and for what duration. An example of such a traffic controller is found in the U.S. Pat. to G. D. Hendricks, No. 3,344,398, which is assigned to the same assignee as the present invention.

Load switches LS-1, LS-2 and LS-3 each incorporate a triac. Thus, switch LS-1 includes a triac 14 having its gate connected to terminal G of controller LC and its terminal T2 connected through an alternating current voltage source V to ground. Terminal T1 of triac 14 is connected through normally closed relay contacts CR1-1 to green light GL. In a similar fashion, terminals T2 of triacs 16 and 18 in load switches LS-2 and LS-3 are also connected through voltage source V to ground. Terminal T1 of triac 16 is coupled through normally closed relay contacts CR1-2 to the yellow light YL. Similarly, terminal T1 of triac 18 is coupled through normally closed relay contacts CR1-3 to red light RL. Terminal T1 and the gate of each triac are coupled to the associated error detector circuit ED-1, ED-2 or ED-3 as shown in FIG. 1. The outputs of the error detector circuits are coupled to the input of NOR-gate 10. This NOR gate, as well as the remaining NOR gates, disclosed herein, preferably take the form of the resistor-transistor logic RLT NOR gate illustrated in FIG. 7.5, at page 178, of General Electric's Transistor Manual, 7th Edition.

The time control circuit TC includes a NOR gate 20, used as a signal inverter, together with an RC timing circuit 22. This timing circuit may take various forms, such as a unijunction relaxation oscillator circuit, illustrated in FIG. 13,18, at page 313, of General Electric's Transistor Manual, 7th Edition. Briefly, this oscillator circuit includes a capacitor which is normally short circuited by a binary "1" signal from NOR circuit 20. However, when the output binary signal of NOR-circuit 20 becomes a binary "0" signal this short circuit is removed, whereupon the capacitor charges toward the value of a direct current voltage source. When the level of the voltage stored reaches the peak point voltage of the unijunction transistor, the capacitor discharges through the emitter to base B1 of the unijunction transistor and a positive voltage pulse appears across a load resistor. This positive pulse may be considered as a binary "1" signal. Whenever the capacitor is not discharging through the unijunction transistor, the output of timer 22 is at a ground or binary "0" level.

The output of the timer control circuit TC is applied to NOR-gate 24 in memory circuit M. This memory circuit includes an additional NOR-gate 26 which is coupled to the output of NOR-gate 24 and has a feedback path for defining a bistable multivibrator circuit. The output of NOR-gate 26 is also coupled through a normally open switch S-1 to ground potential. Closure of this switch serves to reset memory M, as will be described in detail with respect to the operation of the circuitry.

The output of memory M is coupled to the gate of a triac 12 having its terminal T1 coupled to ground and terminal T2 coupled to voltage source V. Terminal T2 is also coupled to a flasher F through relay coil CR1-C. The other side of flasher F is coupled through the normally open side of relay contacts CR1-2. Flasher circuit F may take any suitable form such as a motor-controlled circuit interrupter for alternating opening and closing the circuit between source V and the normally open contacts of relay contacts CR1-2. Such a flasher commences operation upon closure of contacts CR1-2.

ERROR DETECTOR CIRCUIT

Reference is now made to FIG. 2 which illustrates the error detection circuitry located within each of the error detector circuits ED-1, ED-2 and ED-3. This circuit includes a first input terminal IN-1 and a second input terminal IN-2. With respect to error detector circuit ED-1, terminal IN-2 is coupled to output terminal G of load control LC and input terminal IN-1 is coupled to terminal T1 of triac 14. Preferably, the control signal to be carried by terminals G, Y and R of controller LC are positive direct current signals, or are converted to such by suitable circuitry. Input IN-2 is coupled to the base of an NPN-transistor 30, having its emitter connected to ground and its collector connected to one end of a capacitor 32 which has its other end connected to ground. Terminal IN-1 is coupled through a resistor 34 and a series-connected rectifying diode 36, poled as shown, to the junction of the collector of transistor 30 and capacitor 32. The junction of diode 36 and resistor 34 is coupled through a resistor 38 to ground. The junction of the collector of transistor 30 and capacitor 32 is also connected through a resistor 40 to one input of NOR-gate 10.

OPERATION

During the operation of circuitry illustrated in FIGS. 1 and 2, it may be assumed that initially the load controller LC has energized its green terminal G with a positive direct current signal. This signal is coupled to the gate of triac 14 in load switch LS-1 so as to gate the triac into conduction. Accordingly, alternating current voltage from source V is applied through the triac and normally closed relay contacts CR1-1 to energize the green lamp GL. The positive signal on terminal G is applied to the input terminal IN-2 of error detector circuit ED-1. Thus, transistor 30 is biased into conduction to short circuit capacitor 32. The alternating current taken from terminal T1 of triac 14 is applied to input terminal IN-1 of the error detector circuit ED-1, and is rectified by rectifier 36. However, since transistor 30 is forward-biased into conduction, the rectified output from diode 36 is short circuited to ground and a binary "0" signal is applied to the input of NOR-gate 10. This, of course, is indicative that green light GL is properly energized and no error has occurred.

In the event the local controller LC did not energize its output terminal G with a positive signal, then the triac 14 should not conduct to energize green light GL. However, in the event of extreme high operating temperatures and the specific circuitry employed with triac 14, the triac may be gated into conduction. Also, there may be some other malfunction that will cause a short circuit between terminals T1 and T2. In such an event, green light GL will be energized although no control signal was supplied by load controller LC. With reference now to FIG. 2, it will be noted that since no control signal is applied to input terminal IN-2, transistor 30 is reverse-biased, removing the short circuit from capacitor 32. The alternating current obtained from terminal T1 of triac 14 will be rectified by diode 36 and filtered by capacitor 32 to provide a positive or binary "1" signal to the input of NOR-gate 10. This is indicative of an error condition.

Since a "1" signal has been applied to one of its input terminals, NOR-gate 10 now applies a binary "0" signal to the input of NOR-gate 20 in the timer control circuit TC. This changes the output of NOR-gate 20 to a binary "1" signal, whereupon the timing circuit 22 times a predetermined period of time and then provides a binary "1" signal pulse which is applied to the input of NOR-gate 24. This causes the output of NOR-gate 26 to become a binary "1" signal and this state of the memory M is retained due to the feedback circuit until switch S-1 is momentarily closed to return the memory to its normal condition. The binary "1" signal obtained from the output of NOR-gate 26 serves to gate triac 12 into conduction to thereby energize relay coil CR1-C. This causes the normally open contacts of relay contacts CR1-2 to become closed to energize flasher F to then alternately energize and deenergize yellow lamp YL. The yellow lamp will stay in this flashed condition until switch S-1 is momentarily closed to reverse the memory circuit to the condition wherein it applies a binary "0" signal to the gate of triac 12. As the alternating current voltage obtained from source V crosses through a zero level, the triac will cease to conduct, deenergizing relay CR1. The operation in conjunction with detecting an error for the yellow lamp YL or the red lamp RL is the same as described above with respect to the green lamp GL and no further description is deemed necessary for a complete understanding of the invention.

Although the invention has been shown in connection with a preferred embodiment, it will be readily apparent to those skilled in the art that various changes in form and arrangement of parts may be made to suit requirements without departing from the spirit and scope of the invention as defined by the appended claims.

I claim:

1. In a load control system having at least one energizable load; switching means activatable by a control signal for coupling said load with an alternating current voltage source for energizing said load; and load control means for providing said control signal; the improvement comprising:
   means for providing an error signal in response to a condition wherein said load is energized in the absence of a said control signal applied to said switching means.
   means for providing an alarm indication and a delay device for energizing said alarm indication means a predetermined interval of time after occurrence of an error signal.

2. In a load control system having an energizable load with a load terminal, switching means having a power supply terminal and a control signal terminal for a coupling said load terminal to the power supply terminal upon application of a control signal to the control signal terminal and load control means for providing such a control signal, the improvement comprising:

means for providing an error signal in response to a condition wherein said load is energized in the absence of a control signal applied to said control signal terminal, said error signal means comprising a current storage device coupled to said load terminal having an output terminal for providing an error signal when energized and a short circuiting device connected to said terminal with a control element connected to said control signal terminal for short circuiting said current storage device upon the occurrence of a control signal, whereby an error signal is produced only upon the occurrence of energy at said load terminal without the occurrence of a control signal at said control signal terminal.

3. In a load control system as set forth in claim 1, the improvement wherein said alarm indication means includes a visual display.

4. In a load control system having an energizable load, switching means activatable by a control signal for coupling said load with an alternating-current voltage source for energizing said load; and load control means for providing said control signal; the improvement comprising:

means for providing an error signal in response to a condition wherein said load is energized in the absence of a control signal applied to said switching means, said error signal means including a first input interposed between said switching means and said load for receiving alternating current from said voltage source, a second input for receiving a said control signal, and circuit means having an output circuit and being interposed between said inputs for providing an error signal which is carried by said output circuit when said alternating current is not concurrently received with a said control signal.

5. In a load control system as set forth in claim 4, the improvement wherein said circuit means further includes a storage capacitor having one end coupled to said output circuit and its other end coupled to a reference potential, rectifying means interposed between said one end of said capacitor and said first input for applying rectified current from said alternating current to said capacitor, and means controlled by a said control signal for short circuiting said capacitor during the period a said control signal is received, whereby upon removal of said control signal said capacitor becomes charged by said alternating current so that an error signal is carried by said output circuit.

6. In a traffic control system having at least one traffic signal light for, upon energization, ;isplaying a traffic signal indication; switching means, activatable by a control signal for coupling said signal light with an alternating current voltage source for energizing said signal light; and traffic signal control means for providing said control signal, the improvement comprising:

an error detector circuit having an output circuit for generating an error signal, a first input circuit interposed between said switching means and said traffic signal light for receiving alternating current from said voltage source, a second input circuit for receiving a said control signal and circuit means interposed between said input circuits for providing an error signal on said output circuit so long as said alternating current signal is received without concurrent reception of a said control signal.

* * * * *